United States Patent [19]

Krieger

[11] 4,223,899
[45] Sep. 23, 1980

[54] ISOLATED FUEL TANK

[75] Inventor: Gregory A. Krieger, Brookfield, Wis.

[73] Assignee: Allis-Chalmers Corporation, Milwaukee, Wis.

[21] Appl. No.: 966,116

[22] Filed: Dec. 4, 1978

[51] Int. Cl.³ .............................................. B60K 15/02
[52] U.S. Cl. ..................................... 280/5 A; 180/900
[58] Field of Search ............... 280/5 A, 5 R; 296/195, 296/194; 220/1 V, 5 A; 180/54 D, 900

[56] References Cited

U.S. PATENT DOCUMENTS

| 1,321,857 | 11/1919 | Snell | 280/5 A |
|---|---|---|---|
| 1,504,751 | 8/1924 | Green | 280/5 A |
| 1,611,906 | 12/1926 | Gurney | 280/5 A |
| 2,888,296 | 5/1959 | Huggins | 280/5 A |
| 3,285,359 | 11/1966 | Weeks et al. | 180/54 R |

FOREIGN PATENT DOCUMENTS

| 2736127 | 2/1979 | Fed. Rep. of Germany | 280/5 A |
|---|---|---|---|
| 354295 | 2/1930 | United Kingdom | 280/5 A |

Primary Examiner—John A. Pekar
Attorney, Agent, or Firm—Arthur L. Nelson

[57] ABSTRACT

A fuel tank resiliently mounted on a vehicle chassis to reduce vibrations of the tank and the noise level at the operator station on the vehicle.

The mounting structure for the tank includes brackets connected both to the tank and chassis each providing horizontal and vertical flanges. Resilient isolators are mounted between the horizontal flanges to support the weight of the tank, and resilient isolators are mounted between the vertical flanges to dampen transverse vibrations of the tank.

13 Claims, 6 Drawing Figures

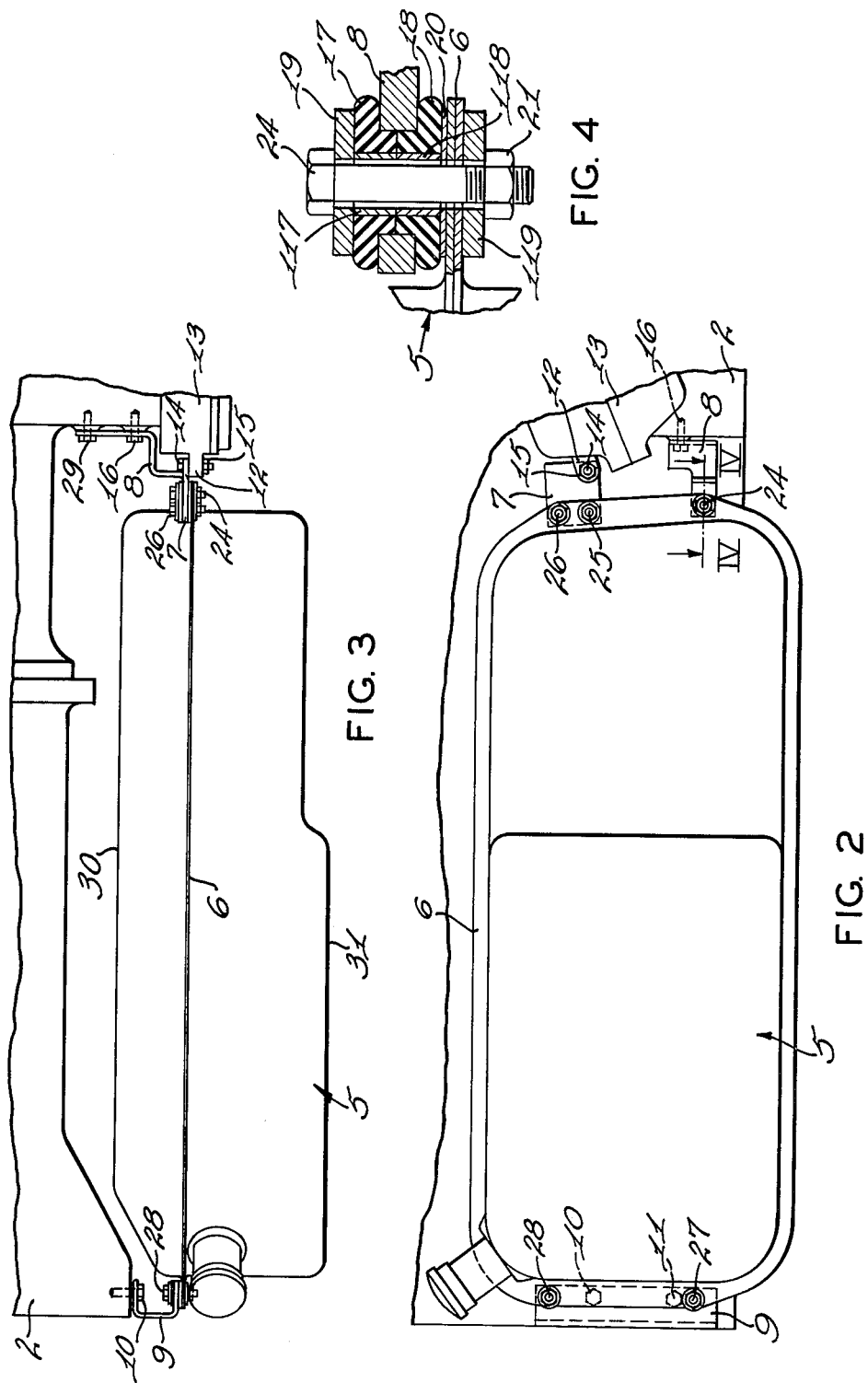

ISOLATED FUEL TANK

This invention relates to a tank and more particularly to resilient mounting of a fuel tank to reduce vibration and resonance of the fuel tank. The resilient isolators provide a support for the increased weight of the fuel tank when filled and prevent vibration and resonance of the walls of the fuel tank which raise the sound level at the operator station of the vehicle.

Normally, the fuel tank on a vehicle is subject to vibrations which may be transmitted from the vehicle chassis or may be produced due to the roughness of terrain when operating the vehicle. The fuel in the tank, to a certain extent, operates as a dampener to reduce the vibrations and the noise. Resilient isolators, however, also provide a support to isolate the chassis from the tank to reduce the vibrations when the fuel tank is close to empty. The resilient isolators provide a cushion to dampen vibrations and reduce the sound level inherent with the vibration of the sides of the tank.

Accordingly, it is an object of the this invention to isolate the fuel tank from the vehicle chassis.

It is another object of this invention to provide a fuel tank mounted on resilient isolators to dampen the vibration transmitted from the vehicle chassis to the fuel tank and to provide a cushion to prevent resonance of the fuel tank at certain frequencies, particularly when the fuel tank is nearly empty.

It is a further object of this invention to provide a fuel tank mounted from a supporting flange through resilient isolators to the vehicle chassis for adequate support when a tank is full and dampening the vibrations of the tank when it is partially empty.

The objects of this invention are accomplished by utilizing a seam on the fuel tank normally produced by the welding of the two halfs of the tank together. The seam operates as a support for the fuel tank and resilient isolators are mounted on the vehicle chassis with resilient support for the fuel tank. The resilient isolators dampen the vibrations transmitted from the vehicle chassis to the fuel tank and avoid resonance of the sides of the fuel tank particularly when near empty. The support is adequate to carry the fuel tank when it is full of fuel. The resilient isolators reduce the vibrations and the noise level which are normally transmitted to the operator station.

Referring to the drawings:

FIG. 2 is an enlarged side elevation view of the fuel tank mounted on the tractor.

FIG. 3 is a plan view of the fuel tank and its mounting on the tractor.

FIG. 4 is a cross section view taken on lines IV—IV of FIG. 2.

Figure 1:
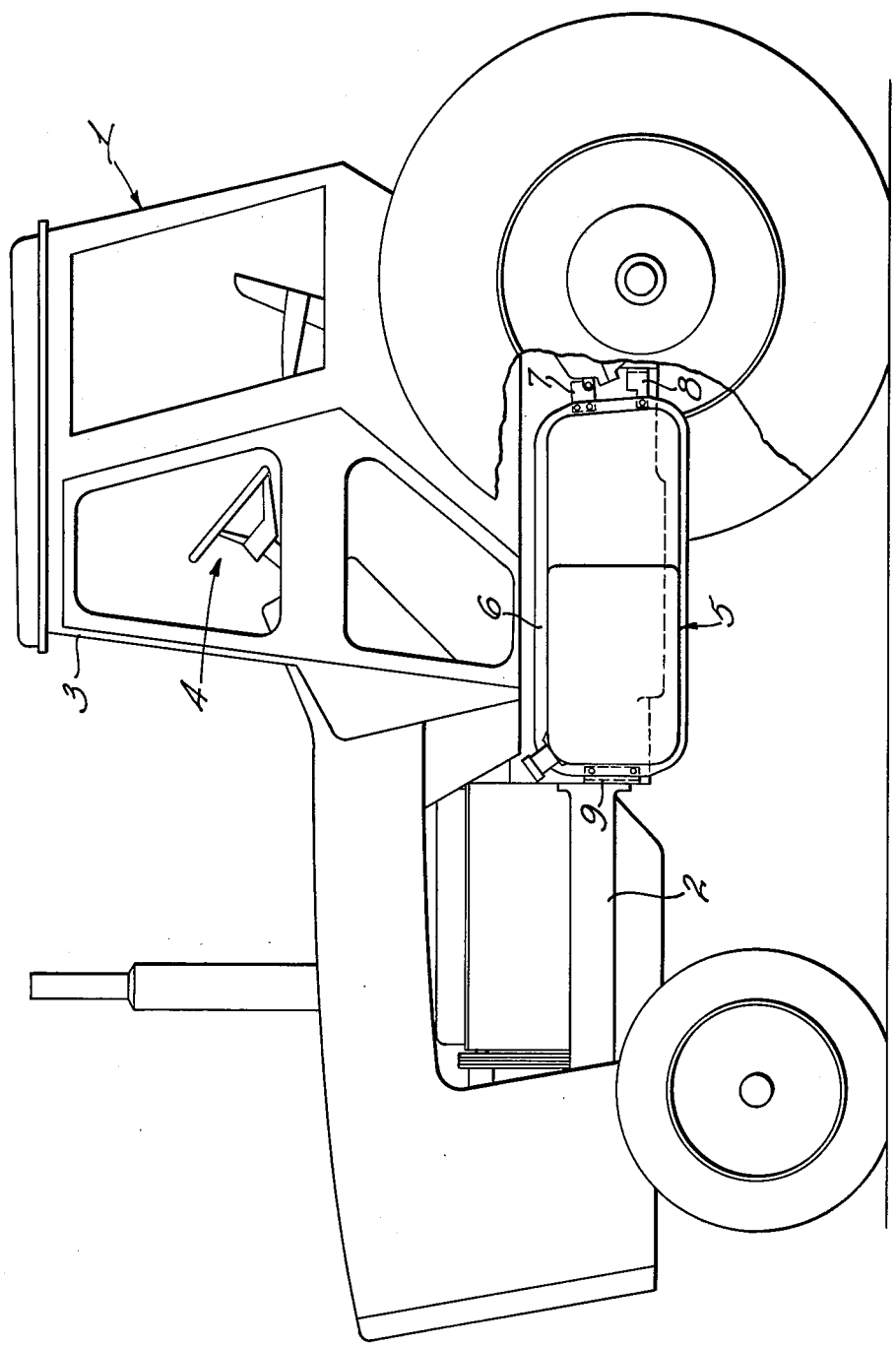
FIG. 1 is a side elevation view of the tractor showing a fuel tank mounted thereon.
Figure 6:
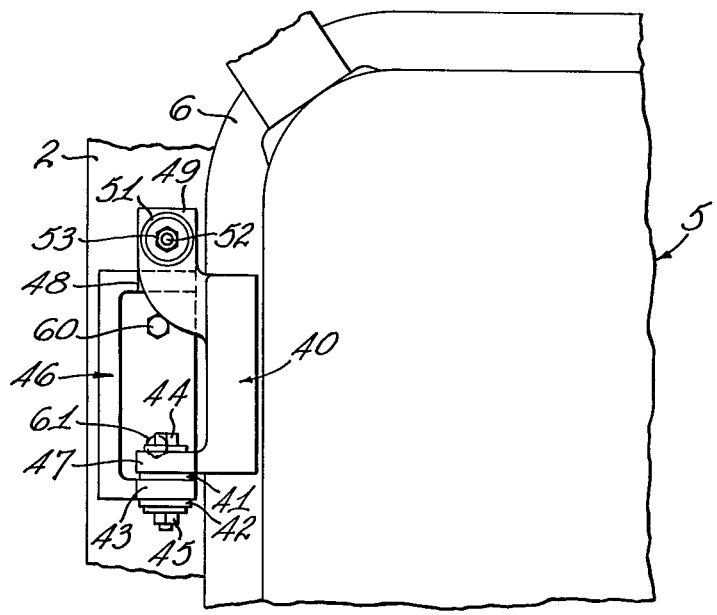
FIG. 6 is a side elevation view of FIG. 5.

Referring to the drawings, FIG. 1 illustrates a tractor 1 having a vehicle chassis 2 for supporting the cab 3 defining the operator station 4. The fuel tank 5 is mounted on the vehicle chassis 2 through suitable brackets and resilient isolators.

FIG. 2 illustrates an enlarged side elevation view of the fuel tank 5. The fuel tank 5 is formed with a seam defining a peripheral flange 6. Peripheral flange 6 provides a means for supporting the fuel tank through the brackets 7, 8 and 9. The bracket 9 is fastened to the chassis 2 by means of the bolts 10 and 11. The bracket 7 is carried on the abutment 12 on the housing 13 by means of the bolt 14 and nut 15. The bracket 8 is fastened by means of the bolts 16 and 29 on the chassis 2.

Each of the resilient supports for the flange 6 of the fuel tank 5 are essentially the same. Isolators 17 and 18 are pressed between the disks 19 and 119 and the washer 20 by the bolt 24 and nut 21. The bracket 8 supports the two isolators 17 and 18 with inner sleeves 117 and 118.

As shown, five pairs of isolators support the fuel tank. The isolators are supported on the bolts 24, 25, 26, 27 and 28. Bracket 8 is supported by the bolts 16 and 29.

Figure 5:
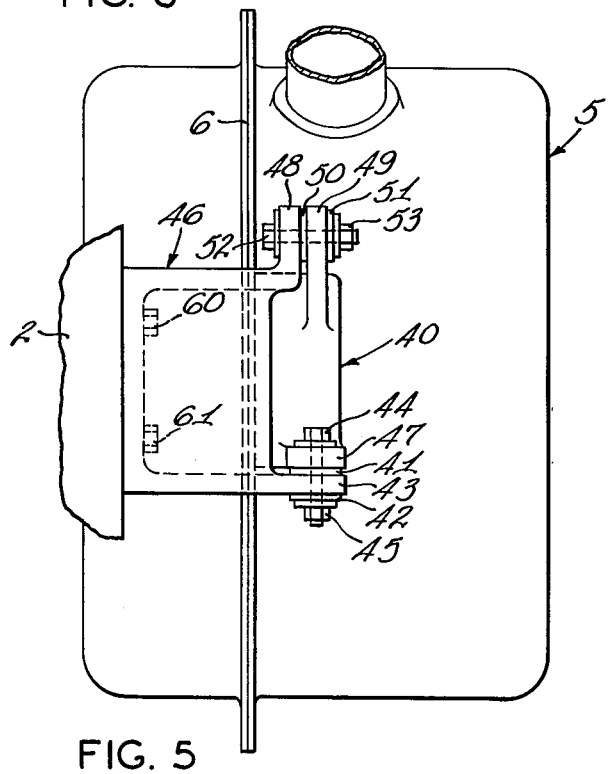
FIG. 5 is a front end view of a fuel tank showing a modification of its support mounting.

FIG. 5 shows the brackets 40 welded to the seam 6. The bracket 40 carries resilient isolators 41 and 42 on opposing sides of the horizontal flange 43 of the mounting 46. Bolt 44 and nut 45 fasten the horizontal support 43 to the horizontal flange 47 of the bracket 40. Similarly, the arm 48 of the mounting 46 carries the vertical flange 49 of bracket 40. The isolators 50 and 51 are carried on the bolt 52 and nut 53. The mounting 46 is fastened by a suitable means such as bolts 60 and 61 to the vehicle chassis to support the fuel tank 5. A mounting of the type as shown in FIG. 5 provides added support through the horizontal bracket and dampening of vibration in a vertical and horizontal plane on the flanges 43 and 49. Either form of mounting on the fuel tank is satisfactory and other means of providing a support may be utilized other than the flange 6. However, since conventionally tanks were built with a welded seam, this flange can be used as a support for the fuel tank.

The device operates in the following described manner.

The bracket 9 mounted on the vehicle chassis 2 is fastened by means of the bolts 10 and 11. The bracket 9 provides a support for pairs of isolators on the bolts 27 and 28 and supports the front end of the fuel tank. The bracket 8, fastened by means of the bolts 16 and 29 to the vehicle chassis 2, supports the bolts 24 which carries a pair of resilient isolators supporting the flange 6 of the fuel tank 5 at the rear end. Also supporting the rear end of the fuel tank is the bracket 7 which is mounted by a bolt 12 on the vehicle chassis 2. The bracket 7 supports the bolts 25 and 26 which each carry a pair of resilient isolators connected to the flange 6 in a manner shown in FIG. 4. Accordingly, the seam forming the flange 6 of the fuel tank 5 provides reinforcement for the fuel tank. Since the two sides of the tank 30 and 31 are sheet material, there is a tendency to vibrate. The vibrations may be transmitted from the vehicle chassis to the fuel tank. Accordingly, the resilient isolators isolate the vehicle chassis and dampen sound vibrations which normally are transmitted to the fuel tank. These vibrations are dampened and the vibrations which are transmitted from the vehicle chassis which may cause resonance of the fuel tank are avoided by the resilient mounting of the fuel tank. The mounting, by use of the flange 6, provides a means of supporting the fuel tank without adding additional brackets to the tank. Brackets may, however, be installed on the fuel tank to provide an additional support for the fuel tank or supporting in a different manner as shown in FIG. 5.

The embodiments of the invention in which an exclusive property or privilege is claimed are defined as follows:

1. A vehicle including, a tank, a vehicle chassis, flange means on said vehicle tank defining horizontal and vertical flanges, means defining horizontal and vertical flanges on said chassis, a plurality of resilient isolators mounted between said horizontal flanges resiliently supporting the weight of said tank, resilient isolators mounted between said vertical flanges to dampen transverse vibrations of said tank.

2. A vehicle as set forth in claim 1 wherein said flange means includes a welded seam for securing sections of said tank together.

3. A vehicle as set forth in claim 1 wherein said flange means includes a vertical seam for reinforcing the periphery of said tank.

4. A vehicle as set forth in claim 1 wherein said means defining flanges on said chassis includes a bracket adjacent the fore end of the tank and a bracket adjacent the rear end of said tank for supporting said tank fore and aft.

5. A vehicle as set forth in claim 1 including a bracket on said chassis defining said vertical and horizontal flanges, resilient isolators connected to said horizontal flange of said bracket for carrying substantial weight of said tank, resilient isolators connected to said vertical flange of said bracket for dampening transverse vibrations, a mounting supporting said resilient isolators for supporting said tank.

6. A vehicle as set forth in claim 1 wherein said tank defines a fuel tank.

7. A vehicle as set forth in claim 1 wherein said flange means includes a vertical weld seam for reinforcing the periphery of said tank, said isolators between said horizontal flanges defining horizontal axes for supporting said flange of said tank.

8. A vehicle as set forth in claim 1 wherein said flange means includes a seam for welding section of said tank together, a bracket mounted between said fuel tank and said resilient isolators for supporting said tank by said seam.

9. A vehicle as set forth in claim 1 wherein said resilient isolators support said tank essentially through the center of gravity of said tank.

10. A vehicle as set forth in claim 1 wherein said tank defines a fuel tank, said flange means includes a peripheral seam extending around said fuel tank and fore and aft of said fuel tank, brackets mounted on the fore end of said fuel tank supported on said vehicle chassis for resiliently supporting said flange of said fuel tank, bracket means on the rear of said fuel tank mounted on said vehicle chassis for supporting the rear of said fuel tank to thereby support said fuel tank by a plurality of brackets fore and aft of said fuel tank.

11. A vehicle as set forth in claim 1 wherein said flange means defining horizontal and vertical flanges on said chassis includes a bracket mounted on said vehicle chassis.

12. A vehicle as set forth in claim 1 wherein said flange means defining horizontal and vertical flanges on said tank includes a bracket connected to said tank.

13. A vehicle as set forth in claim 1 wherein said flange means defining horizontal and vertical flanges on said tank includes a bracket connected to said tank, said flange means defining horizontal and vertical flanges on said chassis includes a bracket connected to said vehicle chassis, said resilient isolators defining horizontal and vertical axes connecting said brackets to resiliently support said tank.

* * * * *